US012486367B2

United States Patent
Abbasi et al.

(10) Patent No.: US 12,486,367 B2
(45) Date of Patent: Dec. 2, 2025

(54) REINFORCED POLYOLEFIN COMPOSITION COMPRISING RECYCLED PLASTIC MATERIAL

(71) Applicant: Borealis AG, Vienna (AT)

(72) Inventors: Mahdi Abbasi, Linz (AT); Susanne Margarete Kahlen, Linz (AT); Hermann Braun, Linz (AT); Wolfgang Stockreiter, Linz (AT); Michael Jerabek, Linz (AT)

(73) Assignee: Borealis AG, Vienna (AT)

( * ) Notice: Subject to any disclaimer, the term of this patent is extended or adjusted under 35 U.S.C. 154(b) by 505 days.

(21) Appl. No.: 17/927,391

(22) PCT Filed: May 25, 2021

(86) PCT No.: PCT/EP2021/063823
§ 371 (c)(1),
(2) Date: Nov. 23, 2022

(87) PCT Pub. No.: WO2021/239694
PCT Pub. Date: Dec. 2, 2021

(65) Prior Publication Data
US 2023/0242717 A1 Aug. 3, 2023

(30) Foreign Application Priority Data

May 27, 2020 (EP) .................... 20176790

(51) Int. Cl.
*C08J 5/04* (2006.01)
*B29B 9/14* (2006.01)
(Continued)

(52) U.S. Cl.
CPC ............... *C08J 5/043* (2013.01); *B29B 9/14* (2013.01); *C08K 3/04* (2013.01); *C08K 3/36* (2013.01);
(Continued)

(58) Field of Classification Search
None
See application file for complete search history.

(56) References Cited

U.S. PATENT DOCUMENTS 5,298,214 A    3/1994 Morrow et al.
2013/0207302 A1    8/2013 Cernohous et al.
(Continued)

FOREIGN PATENT DOCUMENTS

CN    103059416 A    4/2013
CN    103254500 A  *  8/2013
(Continued)

OTHER PUBLICATIONS

Almaadeed et al., "Date palm wood flour/glass fibre reinforced hybrid composites of recycled plypropylene: Mechanical and thermal properties," Materials & Design, 2012, pp. 289-294, vol. 42.
(Continued)

*Primary Examiner* — Eli D. Strah
(74) *Attorney, Agent, or Firm* — The Webb Law Firm

(57) ABSTRACT

Provided is a polyolefin composition including a blend of recycled plastic material including polyproplyene and polyethylene, which is recovered from a waste plastic material derived from post-consumer and/or post-industrial waste; glass fibres; talc; at least one coupling agent; and at least one impact modifier. The polyolefin composition has a tensile modulus of at least 4 GPa, and an impact strength of at least 10 kJ/m².

20 Claims, 1 Drawing Sheet

(51) Int. Cl.
*C08K 3/04* (2006.01)
*C08K 3/36* (2006.01)
*C08K 3/40* (2006.01)
*C08K 7/14* (2006.01)
*B29K 23/00* (2006.01)
*B29K 105/08* (2006.01)

(52) U.S. Cl.
CPC .............. *C08K 3/40* (2013.01); *C08K 7/14* (2013.01); *B29K 2023/06* (2013.01); *B29K 2023/12* (2013.01); *B29K 2105/08* (2013.01); *C08J 2323/06* (2013.01); *C08J 2323/12* (2013.01); *C08J 2325/06* (2013.01); *C08J 2377/02* (2013.01); *C08K 2201/003* (2013.01)

(56) References Cited

U.S. PATENT DOCUMENTS

| | | | |
|---|---|---|---|
| 2018/0201768 A1* | 7/2018 | Jerabek | ............ C08L 23/142 |
| 2019/0084185 A1 | 3/2019 | Hamilton et al. | |
| 2019/0136024 A1 | 5/2019 | Boragno | |
| 2020/0385555 A1 | 12/2020 | Kahlen et al. | |

FOREIGN PATENT DOCUMENTS

| | | |
|---|---|---|
| CN | 103788470 A | 5/2014 |
| CN | 106366401 A | 2/2017 |
| CN | 107531961 A | 1/2018 |
| CN | 107849305 A | 3/2018 |
| CN | 110546198 A | 12/2019 |
| EP | 1377632 B1 | 11/2011 |
| EP | 2776494 A1 | 9/2014 |
| EP | 2815020 A1 | 12/2014 |
| EP | 3088459 A1 | 11/2016 |
| WO | 9808896 A1 | 3/1998 |
| WO | 2014147106 A2 | 9/2014 |
| WO | 2020089196 A1 | 3/2018 |
| WO | WO-2020070176 A1 * | 4/2020 .............. C08L 23/10 |

OTHER PUBLICATIONS

Bajracharya et al., "Experimental and theoretical studies on the properties of injection moulded glass fibre reinforced mixed plastics composites," Composites Part A: Applied Science and Manufacturing, 2016, pp. 393-405, vol. 84.

Bajracharya et al., "Durability characteristics and property prediction of glass fibre reinforced mixed plastics composites," Composites Part B: Engineering, 2017, pp. 16-29, vol. 116.

Hugo et al., "Development of recycled polymer composites for structural applications," Plastics, Rubber and Composites, 2011, pp. 317-323, vol. 40, No. 6-7.

Putra et al., "Mineral filler reinforcement for commingled recycled-plastic materials." J. of Appl. Polymer Science, 2009, pp. 3470-3481, vol. 112, No. 6.

Tzankova Dintcheva et al., "Effects of filler type and processing apparatus on the properties of the recycled "light fraction" from municipal post-consumer plastics," Polymers for advanced technologies, 2001, pp. 552-560, vol. 12, No. 9.

* cited by examiner

REINFORCED POLYOLEFIN COMPOSITION COMPRISING RECYCLED PLASTIC MATERIAL

CROSS REFERENCE TO RELATED APPLICATIONS

This application is the United States national phase of International Application No. PCT/EP2021/063823, filed May 25, 2021, and claims priority to European Patent Application No. 20176790.2, filed May 27, 2020, the disclosures of which are incorporated by reference in their entireties.

BACKGROUND OF THE INVENTION

Field of the Invention

The proposed solution relates to a reinforced polyolefin composition comprising recycled plastic material, to an article comprising the polyolefin composition and a process for preparing such polyolefin composition.

Description of Related Art

Polyolefins, in particular polyethylene and polypropylene are increasingly consumed in large amounts in a wide range of applications, including packaging for food and other goods, fibres, automotive components, and a great variety of manufactured articles. Polyethylene based materials are a particular problem as these materials are extensively used in packaging. Taking into account the huge amount of waste collected compared to the amount of waste recycled back into the stream, there is still a great potential for intelligent reuse of plastic waste streams and for mechanical recycling of plastic wastes.

Generally, recycled quantities of polypropylene on the market are mixtures of both polypropylene (PP) and polyethylene (PE), this is especially true for post-consumer waste streams. Moreover, commercial recyclates from post-consumer waste sources are conventionally cross-contaminated with non-polyolefin materials such as polyethylene terephthalate, polyamide, polystyrene or non-polymeric substances like wood, paper, glass or aluminium. These cross-contaminations drastically limit final applications of recycling streams such that no profitable final uses remain. Polyolefinic recycling materials, especially from post-consumer waste streams, are a mixture of PE and PP. The better the quality of the recyclate is, the less available it is and the more expensive it is.

Customers that are asking for recyclates require similar stiffness-impact strength as virgin ones. This is also valid for reinforced glass fibre compounds for structural products. The quality issue in recyclates compared to the virgin ones can be to some extent overcome by reinforcing the recyclates, where the reinforcement particles physically bond the dissimilar domains (PP and PE).

Recycled mixed plastics reinforced with glass fibre (GF) have been studied. For example, recycled PP or PP/PE mixtures have been reinforced with GF or a hybrid GF with other fillers. EP2776494 (B1) describes a thermoplastic material comprising at least 75% polyolefins from recycling materials and at least 10% sized GF, wherein the GF are chopped GF out of which at least 80% have a length of 2-20 mm.

WO 2014/147106 A2 refers to a polymer formulation, comprising at least one metal oxide selected from CaO, MgO, $Al_2O_3$, ZnO and/or their corresponding hydroxides, wherein the total amount of metal oxides and their corresponding hydroxides is in the range of 0.1-10 wt % on the total weight of the mixture, 0-25 wt % of mineral filler selected from $CaCO_3$, talc, glass fiber, and wood, 8.0-99.9 wt % of polyolefin material from recycled packaging, wherein said polyolefin material comprises at least 80 wt % of PP and/or PE, a PA amount between 0 and 1.0 wt % and a PET amount between 0 and 1.0 wt %, polyolefin materials not from recycled packaging up to achieve 100%.

Hugo et al (Development of recycled polymer composites for structural applications." Plastics, Rubber and Composites 2011, 40(6-7): 317-323) describes recycled polymer compositions using plate-like mica (aspect ratio 20:1 and median particle size of 13.5 µm), GF (14 µm diameter and 4.5 mm length) and a mixtures as reinforcement/filler for PE/PP recyclates. The PE/PP recyclate had a tensile modulus of 750 MPa. The 20% mica or 15% GF increased the modulus to 1350 MPa. The 30% GF increased tensile modulus only to 2500 MPa, however a hybrid system containing 30% GF and 5% mica increased the modulus to 3250 MPa. It was found that addition of small quantities of mica to glass fibre reinforced blends exhibited a significant synergy in tensile strength and modulus.

Bajracharya et al. (Experimental and theoretical studies on the properties of injection moulded glass fibre reinforced mixed plastics composites." Composites Part A: Applied Science and Manufacturing, 2016, 84: 393-405) and Bajracharya, et al. (Durability characteristics and property prediction of glass fibre reinforced mixed plastics composites." Composites Part B: Engineering, 2017, 116: 16-29) use PE/PP recyclate in the form of flakes by Repeat Plastics (Replas) Pty of Australia which was collected from post-consumer and post-industrial plastic waste. The recyclate had tensile modulus of 906 MPa. They were reinforced with 10, 20 and 30% GF (length of 4.0 mm and diameter of 13.7 µm). A maximum tensile modulus of 3068 MPa was achieved by 30% GF.

CN 103 254 500 A refers to a modified composite material comprising: 100 parts recycled polypropylene, 6-12 parts polyethylene, 6-15 parts of a mineral, 8-12 parts of polyethylene-octene elastomer (POE), 12-30 parts of glass fiber, and 4-10 parts of aids. The composition may also comprise PP functionalized maleic anhydride (as compatibilizer), lubricant agents (e.g. calcium stearate), silan or aluminate coupling agents. The impact strengths of said composite material is below 6.5 kJ/m2 and tensile modulus is below 3300 MPa.

Thus, there are several examples of reinforced recyclates with an increased tensile modulus known. However, there are applications of recyclates requiring not only an increased tensile modulus, but also an increased impact strength at the same time.

SUMMARY OF THE INVENTION

Thus, an object underlying the proposed solution is to provide a polyolefin composition mainly based on polyolefin material recovered from waste plastic material with an improved stiffness-impact strength balance.

This object has been solved by providing a polyolefin composition comprising:
a) 7-82.5 wt % of a blend (A) of recycled plastic material comprising polypropylene and polyethylene, which is recovered from a waste plastic material derived from post-consumer and/or post-industrial waste;
b) 10-40 wt % of glass fibres;

c) 5-30 wt % talc;
d) 0.5-3 wt % of a coupling agent; and
e) 2-20 wt % of an impact modifier, wherein the polyolefin composition has a tensile modulus of at least 4 GPa, and an impact strength of at least 10 kJ/m$^2$.

It is to be understood that further additives may also be included in the polyolefin composition and the sum of all ingredients add always up to 100% in each of the embodiments described herein.

The polyolefin composition is preferably free of any virgin polymer, in particular free of virgin polyethylene and/or any virgin polypropylene. It is in particular preferred if the present polymer composition is free of any virgin polyethylene, such as LDPE, HDPE, LLDPE. The term "virgin" denotes newly produced materials and/or objects prior to first use and not being recycled.

It is further to be noted that talc can also be present also in blend A of recycled plastic material comprising polypropylene and polyethylene (as mentioned further below). Thus, the overall content of talc in the present polyolefin composition may also comprise the talc originally present in recycled blend A.

According to an embodiment the present polyolefin composition comprises
  a) 32-68 wt % of a blend (A) of recycled plastic material comprising polypropylene and polyethylene, which is recovered from a waste plastic material derived from post-consumer and/or post-industrial waste;
  b) 20-30 wt % of glass fibres;
  c) 10-20 wt % talc;
  d) 1-3 wt % of a coupling agent; and
  e) 2-15 wt % of an impact modifier, wherein the polyolefin composition a tensile modulus of at least 4 GPa, and an impact strength of at least 10 kJ/m$^2$.

In a preferred embodiment the present polyolefin composition has a
  a tensile modulus of at least 5 GPa, more preferably at least 5.5 GPa, and even more preferably at least 6 GPa, and
  an impact strength of at least of at least 15 kJ/m$^2$, more preferably at least 17 kJ/m$^2$ and even more preferably of at least 20 kJ/m$^2$.

In an even more preferred embodiment the tensile modulus of the polyolefin composition is between 4 and 7 GPa, preferably between 4.5 and 6 GPa, and the impact strength is between 10 and 25 kJ/m$^2$, preferably between 15 and 22 kJ/m$^2$, preferably between 17 and 20 kJ/m$^2$.

It is to be understood that the tensile modus is measured according to ISO 527-2 using injection moulded specimens as described in EN ISO 1873-2 (and the impact strength is measured according to ISO 179-1.

Thus, a polyolefin composition is provided with an improved stiffness-impact strength balance of PP based recyclates by combination of talc, glass fiber, and an impact modifier. Compounding recyclates with GF strongly improves the stiffness. The addition of an external elastomer as impact modifier improves the impact strength of final compound and to some extent improves the compatibility of the mixed polyolefines in the matrix. It is pointed out that any prediction of impact strength is hard or even impossible. In particular the use of coupling agents (and also mixing/extrusion process) influence impact strength.

Blend (A) is obtained from a recycled waste stream. Blend (A) can be either recycled post-consumer waste- or industrial waste, such as for example from the automobile industry, or alternatively, a combination of both. It is particularly preferred that blend (A) consists of recycled post-consumer waste and/or industrial waste.

In one aspect blend (A) may be a polypropylene (PP) rich material of recycled plastic material that comprises significantly more polypropylene than polyethylene. Recycled waste streams, which are high in polypropylene can be obtained for example from the automobile industry, particularly as some automobile parts such as bumpers are sources of fairly pure polypropylene material in a recycling stream or by enhanced sorting. The PP rich material may be obtainable by selective processing, degassing and filtration and/or by separation according to type and colors such as NIR or Raman sorting and VIS sorting. It may be obtained from domestic waste streams (i.e. it is a product of domestic recycling) for example the "yellow bag" recycling system organized under the "Green dot" organization, which operates in some parts of Germany.

Preferably, the polypropylene rich recycled material is obtained from recycled waste by means of plastic recycling processes known in the art. Such PP rich recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polypropylene rich recycled materials include: Purpolen®PP (Mtm Plastics GmbH), Axpoly® recycled polypropylene pellets (Axion Ltd) and PolyPropylene Copolymer (BSP Compounds). It is considered that the proposed solution could be applicable to a broad range of recycled polypropylene materials or materials or compositions having a high content of recycled polypropylene. The polypropylene-rich recycled material may be in the form of granules.

PP rich blend (A) may have a relative amount of units derived from propylene of greater than 50 wt.-%, preferably greater than 53 wt.-%, more preferably greater than 60 wt.-%, more preferably greater than 70 wt.-%, more preferably greater than 75 wt.-%, more preferably greater than 80 wt.-%, with respect to the total weight of the composition.

It is to be understood that the PP present in the PP rich blend is preferably an isotactic polypropylene. In an embodiment the PP rich blend (A) preferably may have content of isotactic polypropylene of 50 wt.-80 wt. %, with respect to the total weight of blend (A).

Furthermore, PP rich blend (A) may have a relative amount of units derived from ethylene of less than 47 wt.-%, more preferably less than 40 wt.-%, more preferably less than 30 wt.-%, more preferably less than 20 wt.-%, most preferably less than 10 wt.-%. Usually, the relative amount of units derived from ethylene is more than 5 wt.-% with respect to the total weight of the composition. It is to be understood that the PE present is preferably ethylene derived from polyethylene and ethylene containing copolymers.

In another aspect blend (A) may be a polyethylene (PE) rich recycled material, meaning that it contains high amounts of polyethylene. Recycled waste streams, which are high in polyethylene can be obtained for example from cable sheathing manufacturers, film manufacturers and from waste packaging (e.g. flexible films) which is generally produced from polyethylene.

Preferably, the polyethylene rich recycled material is obtained from recycled waste by means of plastic recycling processes known in the art. Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polyethylene rich recycled materials include: DIPOLEN H (Mtm Plastics GmbH), food grade rHDPE (BIFFA PLC) and a range of polyethylene rich materials, such as e.g. HD-LM02041 from PLASgran Ltd. It is considered that the proposed solution could be applicable to a broad range of recycled polyethylene-rich materials or materials or compositions having a high content of recycled polyethylene. The polyethylene-rich recycled material may be in the form of granules. It may be obtained from domestic waste streams (i.e. it is a product of domestic recycling) for example the "yellow bag" recycling system, which operates in some parts of Germany.

PE rich Blend (A) may have a relative amount of units derived from ethylene of greater than 20 wt-%, preferably greater than 27 wt-%, more preferably greater than 30 wt-%, more preferably greater than 35 wt-%, more preferably greater than 40 wt-% with respect to the total weight of the composition. Thus, PE rich blend (A) may have an ethylene content up to 40 wt %, or even up to 47 wt %.

In addition, PE rich blend (A) may have relative amount of units derived from propylene of greater than 40 wt-%, but less than 65 wt-%, with respect to the total weight of the composition.

The polyethylene fraction of the recycled material can comprise recycled high-density polyethylene (rHDPE), recycled medium-density polyethylene (rMDPE), recycled low-density polyethylene (rLDPE), linear low density polyethylene (LLDPE) and the mixtures thereof. In a certain embodiment, the recycled material is high density PE with an average density of greater than 0.8 g/cm$^3$, preferably greater than 0.9 g/cm$^3$, most preferably greater than 0.91 g/cm$^3$.

Blend (A) may also have a relative amount of polystyrene of between 0 and 5.0 wt.-%, preferably between 0.5 and 4.0 wt.-%, more preferably between 1.0 and 3.0 wt.-%, most preferably between 1.5 and 2.5 wt.-%.

According to the solution, blend (A) has a content of limonene as determined using solid phase microextraction (HS-SPME-GC-MS) of 0.1 ppm to 100 ppm, more preferably from 1 ppm to 50 ppm, most preferably from 2 ppm to 35 ppm. Limonene is conventionally found in recycled polyolefin materials and originates from packaging applications in the field of cosmetics, detergents, shampoos and similar products. Therefore, blend (A) contains limonene, when blend (A) contains material that originates from such types of domestic waste streams.

The fatty acid content is yet another indication of the recycling origin of blend (A). However, in some cases, the fatty acid content may be below the detection limit due to specific treatments in the recycling process. According to the solution, blend (A) preferably has a content of fatty acids as determined using solid phase microextraction (HS-SPME-GC-MS) of from 1 ppm to 200 ppm, preferably from 1 ppm to 150 ppm, more preferably from 2 ppm to 100 ppm, most preferably from 3 ppm to 80 ppm.

In a preferred aspect, blend (A) (i) contains less than 5 wt %, preferably less than 1.5 wt.-% polystyrene; and/or (ii) contains less than 3.5 wt.-%, preferably less than 1 wt % talc; and/or (iii) contains less than 1.0 wt.-%, preferably less than 0.5 wt % polyamide.

Due to the recycling origin blend (A) may also contain: organic fillers, and/or inorganic fillers, and/or additives in amounts of up to 10%, preferably 3 wt.-% with respect to the weight of blend (A).

Thus, in an embodiment the present polyolefin composition blend (A) of recycled plastic material comprises
- A-1) a content of polypropylene of 30-98 wt.-%,
- A-2) a content of polyethylene of 2-50 wt.-%
- A-3) 0 to 5.0 wt.-% of polystyrene,
- A-4) 0 to 3.0 wt.-% stabilizers,
- A-5) 0 to 4.0 wt.-% polyamide-6,
- A-6) 0 to 3.0 wt.-% talc,
- A-7) 0 to 3.0 wt.-% chalk,
- A-8) 0 to 1.0 wt.-% paper,
- A-9) 0 to 1.0 wt.-% wood,
- A-10) 0 to 0.5 wt.-% metal,
- A-11) 0.1 ppm to 100 ppm of limonene as determined by using solid phase microextraction (HS-SPME-GC-MS), and
- A-12) 0 to 200 ppm total fatty acid content as determined by using solid phase microextraction (HS-SPME-GC-MS), wherein all amounts are given with respect to the total weight of blend (A).

In one preferred embodiment PP rich blend (A) may comprise
- A-1) a content of polypropylene of 50-98 wt.-%,
- A-2) a content of polyethylene of 2-40 wt.-%,
- A-3) 0 to 5.0 wt.-% of polystyrene,
- A-4) 0 to 3.0 wt.-% stabilizers,
- A-5) 0 to 4.0 wt.-% polyamide-6,
- A-6) 0 to 3.0 wt.-% talc,
- A-7) 0 to 3.0 wt.-% chalk,
- A-8) 0 to 1.0 wt.-% paper,
- A-9) 0 to 1.0 wt.-% wood,
- A-10) 0 to 0.5 wt.-% metal,
- A-11) 0.1 ppm to 100 ppm of limonene as determined by using solid phase microextraction (HS-SPME-GC-MS), and
- A-12) 0 to 200 ppm total fatty acid content as determined by using solid phase microextraction (HS-SPME-GC-MS), wherein all amounts are given with respect to the total weight of blend (A).

In another preferred embodiment PE enriched blend (A) may comprise
- A-1) a content of polypropylene of 30-70 wt.-%,
- A-2) a content of polyethylene of 20-50 wt.-%
- A-3) 0 to 5.0 wt.-% of polystyrene,
- A-4) 0 to 3.0 wt.-% stabilizers,
- A-5) 0 to 4.0 wt.-% polyamide-6,
- A-6) 0 to 3.0 wt.-% talc,
- A-7) 0 to 3.0 wt.-% chalk,
- A-8) 0 to 1.0 wt.-% paper,
- A-9) 0 to 1.0 wt.-% wood,
- A-10) 0 to 0.5 wt.-% metal,
- A-11) 0.1 ppm to 100 ppm of limonene as determined by using solid phase microextraction (HS-SPME-GC-MS), and
- A-12) 0 to 200 ppm total fatty acid content as determined by using solid phase microextraction (HS-SPME-GC-MS), wherein all amounts are given with respect to the total weight of blend (A).

As stated above blend (A) may include one or more further components, selected from:
- A-4) up to 3.0 wt.-% stabilizers, preferably up to 2.0 wt.-% stabilizers,
- A-5) up to 4.0 wt.-% polyamide-6, preferably up to 2.0 wt.-% polyamide-6,
- A-6) up to 3.0 wt.-% talc, preferably up to 1.0 wt.-% talc, A-7) up to 3.0 wt.-% chalk, preferably up to 1.0 wt.-% chalk, A-8) up to 1.0 wt.-% paper, preferably up to 0.5 wt.-% paper, A-9) up to 1.0 wt.-% wood, preferably up to 0.5 wt.-% wood, and A-10) up to 0.5 wt.-% metal, preferably up to 0.1 wt.-% metal, based on the overall weight of blend (A).

Blend (A) may have a melt flow rate (ISO 1133, 2.16 kg, 230° C.) of 4 to 20 g/10 min, preferably of 5 to 15 g/10 min, more preferably of 6 to 12 g/10 min.

The polyolefin composition according to the solution may have a melt flow rate (ISO 1133, 2.16 kg, 230° C.) between 0.5 and 6 g/10 min, preferably between 1.5 and 5 g/10 min, more preferably between 2 and 4 g/10 min, and the density of the polyolefin composition is between 800 and 1500 kg/m$^3$, preferably between 850 and 1300 kg/m$^3$, more preferably between 900 and 1100 kg/m$^3$.

As mentioned above, the polyolefin composition according to the solution comprises glass fibers, in particular short glass fibers. The glass fibers used in the fiber reinforced composite preferably have an average fiber length in the range of from 2.0 to 10.0 mm, preferably in the range of 2.0 to 8.0 mm, even more preferably in the range of 2.0 to 6.0 mm, still more preferably in the range of 3.0 to 5.5 mm, even more preferably of 3.5-5.0 mm.

It is further preferred that the short glass fibers used in the fiber reinforced composite preferably have an average diameter of from 5 to 20 µm, more preferably from 8 to 18 µm, still more preferably 8 to 15 µm, even more preferably 10-15 µm, preferably of 11-14 µm, preferably 12-14 µm, more preferably of 12.3-13.7 µm, even more preferably of 12.5-13.5 µm.

In one preferred embodiment glass fibers are used which have a fibre length of 3.0-5.0 mm (average 4.0 mm), and a fibre diameter of 12.3-13.7 µm (average 13 µm). In another preferred embodiment glass fibers are used which have a fibre length of 3.5-5.5 mm (average 4.5 mm), and a fibre diameter of 12-14 µm (average 13 µm).

As also mentioned above, the polyolefin composition according to the solution comprises talc. The talc comprises particles with a size d$_{50}$ of 2.5-5 µm, preferably of 3.0-4.5 µm, more preferably of 3.5-4.0 µm. In one preferred embodiment talc 1 is used which is a fine micronised talc with Particle Size d$_{50}$ of about 3.5-5.0 µm. In another preferred embodiment talc 2 is used which is a fine micronised talc with Particle Size d$_{50}$ of about 2.9-4.1 µm. The diameter of the commercially available talc is typically measured by the Sedigraph method. The talc is commercially available from known suppliers such as Imerys.

As also mentioned above, the polyolefin composition according to the solution comprises at least one coupling agent. The at least one coupling agent is a functionalized polypropylene, in particular a polypropylene functionalized with maleic anhydride (MAH). The amount of coupling agent in the polyolefin composition may be 1-2 wt %, such as 1.4 wt. %. It is to be understood that no silane or aluminate coupling agents are used in the present polyolefin composition.

As further mentioned above, the polyolefin composition according to the solution comprises at least one impact modifier. The impact modifier may be a plastomer and/or an elastomer. Suitable elastomers may be ethylene/propylene copolymers with different C2/C3 ratio (C2/C3 or C3/C2 elastomers), ethylene/butene copolymers (C2/C4 elastomers), ethylene/octene copolymers (C2/C8 elastomers) grafted ethylene elastomers (such as MAH grafted ethylene elastomer) or C2/C3 and C2/C4 block copolymers, in particular an ethylene based 1-octene elastomer. The ethylene based 1-octene elastomer has an MFR (190° C., 2.16 kg) between 0.5 and 8 g/10 min, a density between 866-904 kg/m$^3$. The addition of the elastomer increases the impact strength to 15-30 kJ/m$^2$.

In a further embodiment the polyolefin composition may comprise further additives. Examples of additives for use in the composition are pigments or dyes (for example carbon black), stabilizers (anti-oxidant agents), anti-acids and/or anti-UVs, antistatic agents, nucleating agents and utilization agents (such as processing aid agents). Preferred additives are carbon black, at least one antioxidant and/or at least one UV stabilizer. Lubricants, such as calcium stearate may be used. However, it is also possible that no lubricants such as calcium stearate or polyethylene wax may be used in the present polyolefin composition.

Generally, the amount of these additives is in the range of 0 to 5.0 wt.-%, preferably in the range of 0.01 to 3.0 wt.-%, more preferably from 0.01 to 2.0 wt.-% based on the weight of the total composition.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends. Preferred antioxidants may be Tris (2,4-di-t-butylphenyl) phosphite and/or Octadecyl 3-(3',5'-di-tert. butyl-4-hydroxyphenyl)propionate.

Anti-acids are also commonly known in the art. Examples are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1).

Common antiblocking agents are natural silica such as diatomaceous earth (such as CAS No. 60676-86-0 (SuperfFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344 0, or sodium calcium aluminosilicate, hydrate CAS-No. 1344-01-0).

Anti-UVs are, for example, Bis-(2,2,6,6-tetramethyl-4-piperidyl)-sebacate (CAS-No. 52829-07-9, Tinuvin 770); 2-hydroxy-4-n-octoxy-benzophenone (CAS-No. 1843-05-6, Chimassorb 81). Preferred UV stabilizers may be low and/or high molecular weight UV stabilizers such as n-Hexadecyl-3,5-di-t-butyl-4-hydroxybenzoate, A mixture of esters of 2,2,6,6-tetramethyl-4-piperidinol and higher fatty acids (mainly stearic acid) and/or Poly((6-morpholino-s-triazine-2,4-diyl)(1,2,2,6,6-pentamethyl-4-piperidyl)imino)hexameth-ylene (1,2,2,6,6-pentamethyl-4-piperidyl)imino)).

Alpha nucleating agents like sodium benzoate (CAS No. 532-32-1); 1,3:2,4-bis(3,4-dimethylbenzylidene)sorbitol (CAS 135861-56-2, Millad 3988). Suitable antistatic agents are, for example, glycerol esters (CAS No. 97593-29-8) or ethoxylated amines (CAS No. 71786-60-2 or 61791-31-9) or ethoxylated amides (CAS No. 204-393-1). Usually these additives are added in quantities of 100-2.000 ppm for each individual component of the polymer.

In a preferred embodiment the polyolefin composition comprises 45-55 wt % of blend (A) as main polymer, 20-30 wt % glass fibers, 10-20 wt % talc, 5-10% impact modifier, 1-1.5% coupling agent, 1% carbon black, 0.25-5 wt % of at least one antioxidant, 0.3-0.4 wt % of at least one low molecular weight UV stabilizer and 0.1-0.2 wt % of at least one high molecular weight UV stabilizer.

It is appreciated that the solution also refers to a process for producing the polyolefin compositions as defined herein. The process comprises the steps of
providing a mixture of the blend (A), glass fibers, talc, a coupling agent and impact modifier in the required amounts;
melting the mixture in an extruder, and
optionally pelletizing the obtained polyolefin composition.

For the purposes of the solution, any suitable melting and mixing means known in the art may be used for carrying out the mixing and melting.

However, the melting and mixing step preferably takes place in a mixer and/or blender, high or low shear mixer, high-speed blender, or a twin-screw extruder. Most preferably, the melting and mixing step takes place in a twin-screw extruder such as a co-rotating twin-screw extruder. Such twin-screw extruders are well known in the art and the skilled person will adapt the melting and mixing conditions (such as melting temperature, screw speed and the like) according to the process equipment.

The polyolefin composition according to the solution can be used for a wide range of applications, for example in the manufacture of structural products, appliances, automotive articles, pipes, films, geo-membranes, roofing applications, pond liners, packaging, caps and closures. Additionally, due to the satisfactory tensile properties of the compositions of the present invention, they may be employed as films (with a thickness of 400 microns or less) or for flexible foils (with a thickness of more than 400 microns) such as geo-membranes for agriculture, roofing applications and as pond liners. Typically, the compositions described herein are used as a core layer of a multilayer sheet (e.g. a three layer geo-membrane sheet), where the external layers are made of various kinds of polyolefin materials.

BRIEF DESCRIPTION OF THE DRAWINGS

The proposed solution is now explained in more detail with reference to the examples.

DESCRIPTION OF THE INVENTION

Experimental Section

Figure 1:
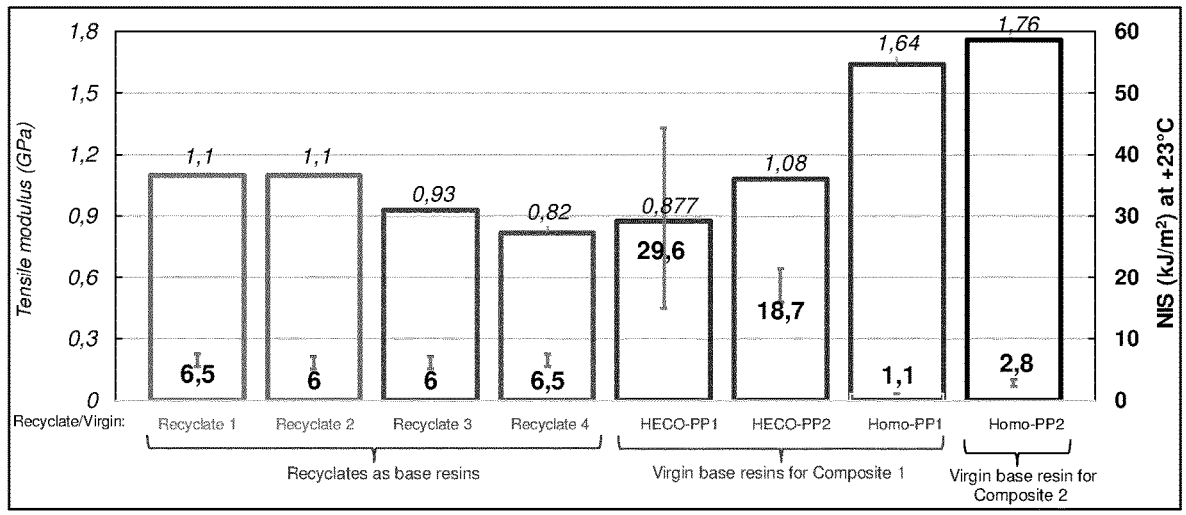
FIG. 1 shows a diagram illustrating the tensile modulus and impact strength of recyclates blend (A) used for reinforced polyolefin composition composites.

The following Examples are included to demonstrate certain aspects and embodiments of the solution as described in the claims. It should be appreciated by those of skill in the art, however, that the following description is illustrative only and should not be taken in any way as a restriction of the solution.

Test Methods a) Amount of iPP, Polystyrene, Content of Ethylene (Ande-Ethylene Containing Copolymers) and Amount of Polyamide-6

To establish different calibration curves different standards, iPP and HDPE and iPP, PS and PA6 were blended. For the quantification of the content of the foreign polymers, IR spectra were recorded in the solid-state using a Bruker Vertex 70 FTIR spectrometer. Films were prepared with a compression-moulding device at 190° C. with 4-6 MPa clamping force. The thickness of the films for the calibration standards for iPP and HDPE was 300 µm and for the quantification of the iPP, PS and PA 6 50-100 µm film thickness was used. Standard transmission FTIR spectroscopy is employed using a spectral range of 4000-400 $cm^{-1}$, an aperture of 6 mm, a spectral resolution of 2 $cm^{-1}$, 16 background scans, 16 spectrum scans, an interferogram zero filling factor of 32 and Norton Beer strong apodisation.

The absorption of the band at 1167 $cm^{-1}$ in iPP is measured and the iPP content is quantified according to a calibration curve (absorption/thickness in cm versus iPP content in weight %).

The absorption of the band at 1601 $cm^{-1}$ (PS) and 3300 $cm^{-1}$ (PA6) are measured and the PS and PA6 content quantified according to the calibration curve (absorption/thickness in cm versus PS and PA content in wt %). The content of polyethylene and ethylene containing copolymers is obtained by subtracting (iPP+PS+PA6) from 100, taking into account the content of non-polymeric impurities as determined in the methods below. The analysis is performed as a double determination.

b) Amount of Talc and Chalk were measured by Thermogravimetric Analysis (TGA); experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to CO2 evolving from CaCO3, and therefore the chalk content was evaluated as:

$$\text{Chalk content} = 100/44 \times WCO2$$

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

$$\text{Ash content} = (\text{Ash residue}) - 56/44 \times WCO2 - Wcb$$

Where Ash residue is the weight % measured at 900° C. in the first step conducted under nitrogen. The ash content is estimated to be the same as the talc content for the investigated recyclates.

c) Amount of Paper, Wood

Paper and wood were determined by conventional laboratory methods including milling, floatation, microscopy and Thermogravimetric Analysis (TGA).

d) Amount of Metals was determined by x ray fluorescence (XRF).

e) Amount of Limonene was determined by solid phase microextraction (HS-SPME-GC-MS).

Additional details are given below with respect to the specific sample.

F) Amount of Total Fatty Acids
was determined by solid phase microextraction (HS-SPME-GC-MS).

Additional details are given below with respect to the specific sample.

g) Melt flow rates were measured with a load of 2.16 kg (MFR$_2$) at 230° C. or 190° C. as indicated. The melt flow rate is that quantity of polymer in grams which the test apparatus standardized to ISO 1133 extrudes within 10 minutes at a temperature of 230° C. (or 190° C.) under a load of 2.16.

h) Tensile modulus was measured according to ISO 527-2 (cross head speed=1 mm/min; test speed 50 mm/min at 23° C.) using compression moulded specimens as described in EN ISO 1873-2 (dog bone shape, 4 mm thickness). The measurement was done after 96 h conditioning time of the specimen.

i) Impact strength was determined as Charpy Notched Impact Strength according to ISO 179-1 eA at +23° C. on injection moulded specimens of 80×10×4 mm prepared according to EN ISO 1873-2. According to this standard samples are tested after 96 hours.

Example 1: Reinforced PP Rich Blend (Recyclate 1, 2)

a) PP Rich Blend a (Recyclate 1, 2) has the Following Composition
PP content of >80 wt % (second main constituent is PE)
PS (polystyrene) <1 wt %
PA (polyamide) <0.5 wt %
PET traces
Talc <3 wt %
Chalk <1 wt %
TiO$_2$ traces
small amounts (<1 wt %) of paper, wood can also be present Limonene quantification was carried out using solid phase micro-extraction (HS-SPME-GC-MS) by standard addition.

50 mg ground samples were weighed into 20 mL headspace vials and after the addition of limonene in different concentrations and a glass-coated magnetic stir bar, the vial was closed with a magnetic cap lined with silicone/PTFE. Micro capillaries (10 µL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6, 11 and 16.5 mg/kg limonene were used in combination with some of the samples tested in this application. For quantification, ion-93 acquired in SIM mode was used. Enrichment of the volatile fraction was carried out by headspace solid phase micro-extraction with a 2 cm stable flex 50/30 pm DVB/Carboxen/PDMS fibre at 60° C. for 20 minutes. Desorption was carried out directly in the heated injection port of a GCMS system at 270° C.

GCMS Parameters:
Column: 30 m HP 5 MS 0.25*0.25
Injector: Splitless with 0.75 mm SPME Liner, 270° C.
Temperature program: −10° C. (1 min)
Carrier gas: Helium 5.0, 31 cm/s linear velocity, constant flow
MS: Single quadrupole, direct interface, 280° C. inter face temperature
Acquisition: SIM scan mode
Scan parameter: 20-300 amu
SIM Parameter: m/Z 93, 100 ms dwell time

TABLE 1

Limonene content in PP rich blend A (recyclate 1, 2)

| Sample | Limonene [mg/kg] HS-SPME-GC-MS[1] |
|---|---|
| PP rich blend A | 2.6 ± 0.1 |

[1]Headspace Soldiphase Microextraction.

Fatty acid quantification was carried out using headspace solid phase micro-extraction (HS-SPME-GC-MS) by standard addition.

50 mg ground samples were weighed in 20 mL headspace vial and after the addition of limonene in different concentrations and a glass coated magnetic stir bar the vial was closed with a magnetic cap lined with silicone/PTFE. 10 µL Micro-capillaries were used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode was used for all acids except propanoic acid, here ion 74 was used.

GCMS Parameter:
Column: 20 m ZB Wax plus 0.25*0.25
Injector: Split 5:1 with glass lined split liner, 250° C.
Temperature program: 40° C. (1 min) @6° C./min to 120° C., @15° C. to 245° C. (5 min)
Carrier: Helium 5.0, 40 cm/s linear velocity, constant flow
MS: Single quadrupole, direct interface, 220° C. inter face temperature
Acquisition: SIM scan mode
Scan parameter: 46-250 amu 6.6 scans/s
SIM Parameter: m/z 60, 74, 6.6 scans/s

TABLE 2

Total fatty acid content in PP rich blend A (recyclate 1, 2)

| Sample | Total fatty acid concentration [mg/kg][1] |
|---|---|
| PP rich blend A | 28.7 |

[1]The concentration of acetic acid, propionic acid, butyric acid, pentanoic acid, hexanoic acid, octanoic acid, nonanoic acid and decanoic acid in each sample was added together to give a totally fatty acid concentration value.

B) Reinforced PP Rich Blend a (Recylate 1, 2) has the Following Composition:
45 wt % PP rich blend A (recyclate 1, 2),
30 wt % glass fibers 1 (average length 4 mm, average diameter 13 µm),
10 wt % talc 1 (particle size d$_{50}$ of about 3.5-5.0 µm),
10% ethylene based 1-octene elastomer as impact modifier;
1.5 wt % polypropylene functionalized with maleic anhydride (MAH) as coupling agent;
1 wt % carbon black;
0.25 wt % AO200GRA (Tris (2,4-di-t-butylphenyl) phosphite);

0.25 wt % AO102GRA (Octadecyl 3-(3',5'-di-tert. butyl-4-hydroxyphenyl)propionate);
0.38 wt % UV575PEL; and
0.15 wt % UV256PAS Example 2: Reinforced PE Rich Blend A (Recyclate 4)

A) PE Rich Blend a (Recyclate 4) from the Yellow Bag System has the Following Composition PE content of >27 wt % (main constituent of the blend is PP)
PS (polystyrene) <5 wt %
PA (polyamide) <1 wt %
PET traces
Talc <1 wt %
Chalk <9 wt %
$TiO_2$ traces
small amounts (<1 wt %) of paper and wood can also be present Limonene quantification was carried out using solid phase microextraction (HS-SPME-GC-MS) by standard addition as described above for recyclate 1, 2

TABLE 3

| Limonene [mg/kg] content in PE rich blend A (recyclate 4) | |
| --- | --- |
| PE rich blend A (recyclate 4) | 31.5 ± 2.6 |

Fatty acid quantification was carried out using headspace solid phase micro-extraction (HS-SPME-GC-MS) by standard addition as described above for recyclate 1, 2.

TABLE 4

| Total fatty acid concentration [mg/kg] in PE rich blend A (recyclate 4) | |
| --- | --- |
| PE rich blend A (recyclate 4) | 70.6 |

[1]The concentration of acetic acid, propionic acid, butyric acid, pentanoic acid, hexanoic acid, octanoic acid, nonanoic acid and decanoic acid in each sample was added together to give a totally fatty acid concentration value.

B) Reinforced PE Rich Blend a (Recyclate 4) has the Following Composition:
45 wt % PE rich blend A (recyclate 4),
30 wt % glass fibers 1 (average length 4 mm, average diameter 13 μm),
10 wt % talc 1 (particle size $d_{50}$ of about 3.5-5.0 μm),
10% ethylene based 1-octene elastomer as impact modifier;
1.5 wt % polypropylene functionalized with maleic anhydride (MAH) as coupling agent;
1 wt % carbon black;
0.25 wt % AO200GRA (Tris (2,4-di-t-butylphenyl) phosphite);
0.25 wt % AO102GRA (Octadecyl 3-(3',5'-di-tert. butyl-4-hydroxyphenyl)propionate);
0.38 wt % UV575PEL; and
0.15 wt % UV256PAS Example 3: Determining Tensile Modulus and Impact Strength All of the examples shown in the diagrams of FIGS. 1 and 2 have been produced according to standard procedures.

A wide range of recyclates with different PE/PP content as well as mixtures thereof as base resin for inventive GF/Talc composites were used. The diagram of FIG. 1 provides an overview of stiffness-impact strength of recyclates 1-4 used for GF/talc reinforced composites (recyclates 1 and 2 are PP rich blends, and recyclates 3 and 4 are PE enriched or PE rich blends).

The virgin resins HECO-PP1, HECO-PP2 and Homo-PP1 were used together as base resin for PP-GF-T (virgin base resin for composite 1). The Homo-PP2 was also mixed with a Non Prime homo PP grade, as base resin for PP-GF (virgin base resin for composite 2). These resins have different tensile modulus and similar NIS (See FIG. 1).

For comparisons the virgin base resins of PP-GF-T (composite 1) and PP-GF (composite 2) were also shown in FIG. 1. In these examples a wide range of stiffness/impact strength can be seen for virgin and recyclates.

Figure 2:
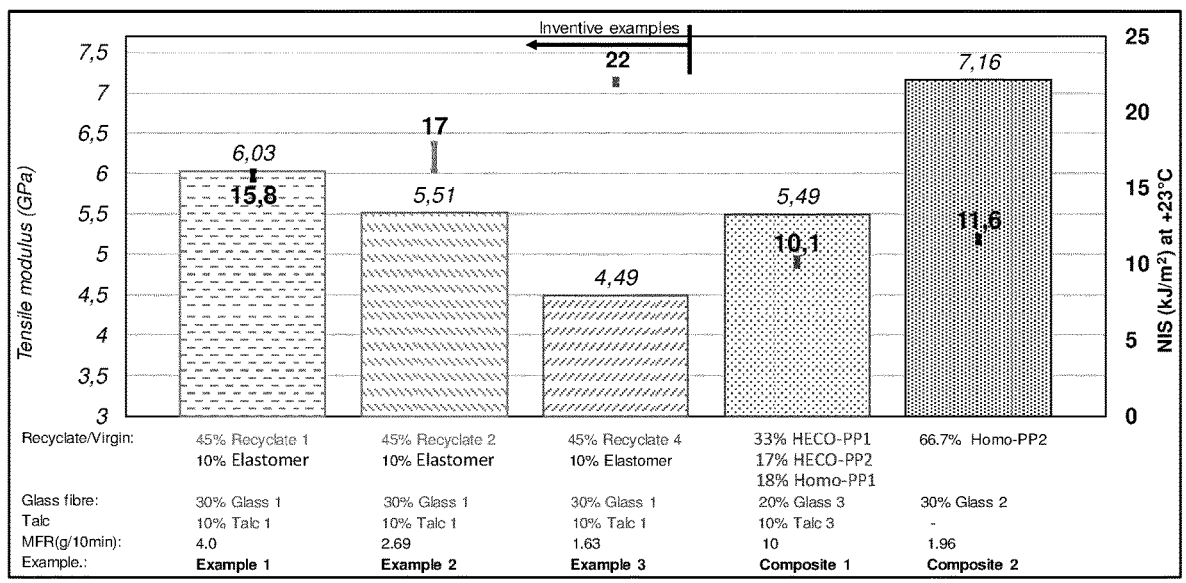
FIG. 2 shows a diagram illustrating the tensile modulus and impact strength of polyolefin compositions with elastomer.

The diagram of FIG. 2 shows the tensile modulus and notched impact strength (NIS) of some of the inventive composites based on different recyclates/blend of recyclates (recyclate 1, 2 and 4) with 10% elastomer, with 30% Glass fibers 1 (average length 4 mm, average diameter 13 μm) and 10% Talc 1 (particle size $d_{50}$ of about 3.5-5.0 μm), as well as current commercial grade PP-GF-T based on virgin PP matrix and 20% finer Glass 3 (average length 3 mm, average diameter 10.5 μm) and 10% higher aspect ratio Talc 3 ($d_{50}$ of about 1.3±0.2 μm) (composite 1), as well as PP-GF based on virgin PP and 30% Glass 2 (average length 4.5 mm, average diameter 13 μm), (composite 2)

The diagram of FIG. 2 provides an overview of stiffness-impact strength of inventive composites based on recyclates (recyclate 1, recyclate 2 and recyclate 4) with 10% elastomer, and all with 30 wt % Glass 1 (average length 4 mm, average diameter 13 μm) and 10 wt % Talc 1 (particle size $d_{50}$ of about 3.5-5.0 μm). Two commercial grades PP-GF-T (composite 1) and PP-GF (composite 2) are based on virgin PP, and 20 wt % Glass 3/10 wt % Talc2 and 30 wt % Glass 2 (average length 4.5 mm, average diameter 13 μm), (without talc), respectively.

As can be seen in FIG. 2 the tensile modulus as well as the impact strength of reinforced recycled based composites can be improved (Examples 1, 2, 3) when compared to recyclates 1-4 without any glass fibers, talc and impact modifier (see FIG. 1). It can also be seen that by adding only 10 wt % impact modifier the NIS can be improved to 15 to 22 $kJ/m^2$, whereby the tensile modulus is 6 to 4.5 GPa (see examples 4-6).

These results show that the virgin matrix can be replaced with recyclates and even better impact strength with only 10% elastomer as impact modifier. For instance, Example 5 (recyclate 2 with 10% elastomer) results in the same stiffness as composite 1 but higher impact strength 17 $kJ/m^2$.

The invention claimed is:
1. A polyolefin composition comprising
  a) 7-82.5 wt % of a blend of recycled plastic material comprising polypropylene and polyethylene, which is recovered from a waste plastic material derived from post-consumer and/or post-industrial waste;
  b) 10-40 wt % of glass fibres;
  c) 5-30 wt % talc;
  d) 0.5-3 wt % of at least one coupling agent; and
  e) 2-20 wt % of at least one impact modifier,
  wherein the polyolefin composition is optionally free of any virgin polyethylene and
  wherein the polyolefin composition has
    a tensile modulus of at least 4 GPa, and
    an impact strength of at least 10 $kJ/m^2$.

2. The polyolefin composition according to claim 1, having
a tensile modulus of at least 5 GPa, and
an impact strength of at least 15 kJ/m².

3. The polyolefin composition according to claim 1, wherein the tensile modulus of the polyolefin composition is 4 to 7 GPa and the impact strength is 10 to 25 kJ/m².

4. The polyolefin composition according to claim 1, wherein the blend of recycled plastic material comprises at least 50 wt % polypropylene.

5. The polyolefin composition according to claim 4, wherein the blend of recycled plastic material comprises at least 60 wt % polypropylene.

6. The polyolefin composition according to claim 1, wherein the blend of recycled plastic material comprises at least 10 wt % polyethylene.

7. The polyolefin composition according to claim 6, wherein the blend of recycled plastic material comprises at least 30 wt %.

8. The polyolefin composition according to claim 1, wherein the blend of recycled plastic material comprises
A-1) a content of polypropylene of 30-98 wt.-%,
A-2) a content of polyethylene of 2-50 wt.-%
A-3) 0 to 5.0 wt.-% of polystyrene,
A-4) 0 to 3.0 wt.-% stabilizers,
A-5) 0 to 4.0 wt.-% polyamide-6,
A-6) 0 to 3.0 wt.-% talc,
A-7) 0 to 3.0 wt.-% chalk,
A-8) 0 to 1.0 wt.-% paper,
A-9) 0 to 1.0 wt.-% wood,
A-10) 0 to 0.5 wt.-% metal,
A-11) 0.1 ppm to 100 ppm of limonene as determined by using solid phase microextraction (HS-SPME-GC-MS), and
A-12) 0 to 200 ppm total fatty acid content as determined by using solid phase microextraction (HS-SPME-GC-MS),
wherein all amounts are given with respect to the total weight of blend.

9. The polyolefin composition according to claim 1, wherein the melt flow rate (ISO 1133, 2.16 kg, 230° C.) of the polyolefin composition is 0.5 to 6 g/10 min and the density of the polyolefin composition is 800 to 1500 kg/m³.

10. The polyolefin composition according to claim 9, wherein the melt flow rate (ISO 1133, 2.16 kg, 230° C.) of the polyolefin composition is 1.5 to 5 g/10 min and the density of the polyolefin composition is 850 to 1300 kg/m³.

11. The polyolefin composition according to claim 1, wherein the glass fibers have a length of 2.0 to 10.0 mm and a diameter of from 5 to 20 µm.

12. The polyolefin composition according to claim 1, wherein the talc comprises particles with a size $d_{50}$ of 2.5-5 µm.

13. The polyolefin composition according to claim 1, wherein the at least one coupling agent is a functionalized polypropylene.

14. The polyolefin composition according to claim 13, wherein the at least one coupling agent is a polypropylene functionalized with maleic anhydride (MAH).

15. The polyolefin composition according to claim 1, having 5-12 wt % of the impact modifier.

16. The polyolefin composition according to claim 15, wherein the impact modifier comprises an ethylene based 1-octene elastomer.

17. The polyolefin composition according to claim 1, further comprising further additives.

18. The polyolefin composition according to claim 17, wherein the additives comprise carbon black, at least one antioxidant and/or at least one UV stabilizer.

19. An article comprising the polyolefin composition according to claim 1.

20. A process for preparing the polyolefin composition according to claim 1, comprising the steps of
providing a mixture of the blend, glass fibers, talc, a coupling agent and an impact modifier in the required amounts;
melting the mixture in an extruder, and
optionally pelletizing the obtained polyolefin composition.

* * * * *